United States Patent [19]

Date et al.

[11] 4,343,030

[45] Aug. 3, 1982

[54] LOAD BREAK SWITCH

[75] Inventors: K. Henry Date; Ronald Wainio, both of South Milwaukee, Wis.

[73] Assignee: McGraw-Edison Company, Rolling Meadows, Ill.

[21] Appl. No.: 231,279

[22] Filed: Feb. 4, 1981

Related U.S. Application Data

[62] Division of Ser. No. 940,104, Sep. 6, 1978, Pat. No. 4,293,834.

[51] Int. Cl.³ .............................................. H02B 1/04

[52] U.S. Cl. ....................................... 361/335; 335/76; 200/153 SC

[58] Field of Search .................. 335/76; 200/153 SC, 200/144 B, 146 AA; 361/334, 335, 331

[56] References Cited

U.S. PATENT DOCUMENTS

| | | | |
|---|---|---|---|
| 2,410,253 | 10/1946 | Trogner | 200/153 SC |
| 3,254,186 | 5/1966 | Fischer | 200/153 SC |
| 3,577,887 | 5/1971 | Lambert | 200/153 SC |
| 3,729,065 | 4/1973 | Baskerville | 200/153 SC |
| 3,784,764 | 1/1974 | Wilson | 200/153 SC |
| 3,789,172 | 1/1974 | Cole et al. | 200/153 SC |
| 3,875,360 | 4/1975 | Rys | 200/153 SC |
| 3,911,240 | 10/1975 | Henderson et al. | 200/153 SC |

*Primary Examiner*—Gerald P. Tolin

*Attorney, Agent, or Firm*—Jon Carl Gealow; Thomas F. McDonald; Roy A. Ekstrand

[57] ABSTRACT

A compact load break switch having at least one vacuum interrupter connected between two terminals carried by respective insulating bushings through a current exchange assembly. The vacuum interrupter is disposed within one of the insulating bushings, and a current exchange insulating housing having portions which extend telescopically into both insulating bushings, provides adequate creepage distance through air from the vacuum interrupter and the current exchange assembly to a grounded housing for the load break switch. Also, a current transformer is disposed about the insulating housing to provide remote indication of the flow of fault current through the current exchange assembly. The switch operating mechanism includes: a torsion spring which when fully charged, is capable of opening and closing the switch several times; a motor driven spring charging mechanism, for fully recharging the torsion spring after each switch operation; a solenoid actuated latch mechanism which may be remotely actuated to open or close the switch; a lockout mechanism for preventing closure of the switch when the torsion spring has insufficient stored energy to open the switch thereafter without being recharged; auxiliary switches for remote indication of the position of the load break switch; and manually-opened mechanisms for recharging the torsion spring and operating the load break switch.

5 Claims, 15 Drawing Figures

FIG. 12
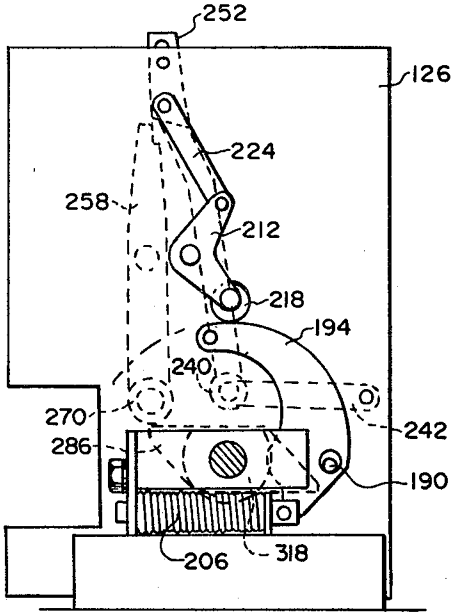
FIG. 13
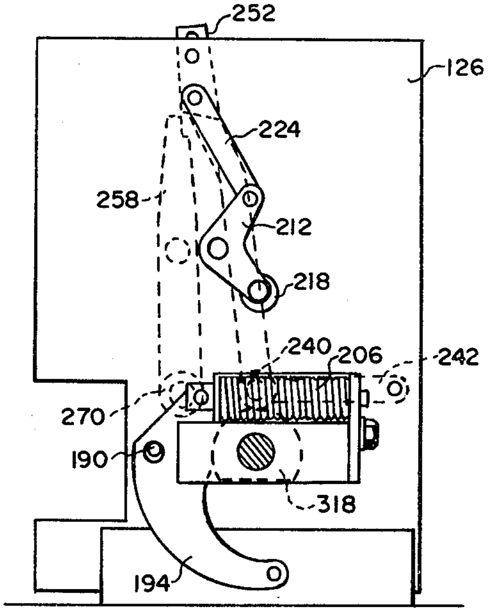
FIG. 11
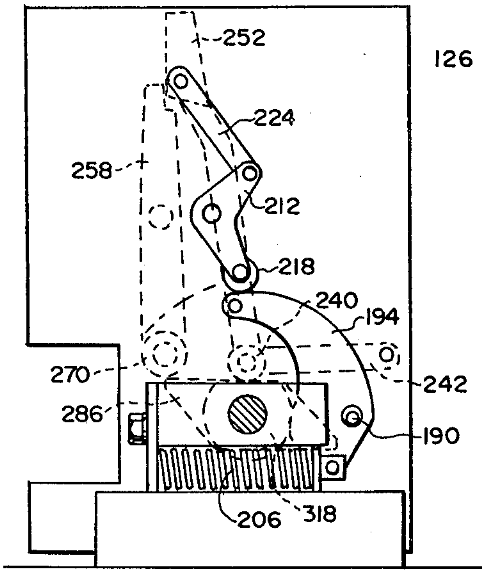
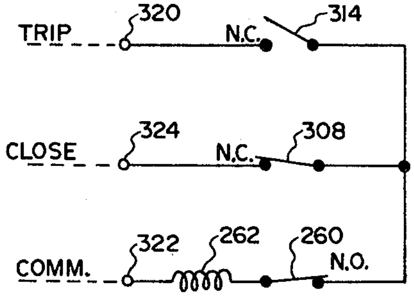
FIG. 10

LOAD BREAK SWITCH

This is a division of application Ser. No. 940,104, filed Sept. 6, 1978, now U.S. Pat. No. 4,293,834.

BACKGROUND OF THE INVENTION

1. Field of the Invention

The invention relates to load break switches, and in particular, to a high voltage, load break switch having a solenoid release spring operating mechanism for opening and closing the switch.

2. Description of the Prior Art

When a circuit interrupter for an electric power distribution line trips in response to a fault condition, remotely operated disconnect switches, strategically placed in the feeders of the distribution circuit, can be opened or closed by an operator at a remote dispatch center to quickly isolate the faulted feeder and restore service to the unfaulted portions of the distribution line. It is desirable that the operating mechanisms of these disconnect switches include an energy storage device, such as a torsion spring, so that these switches can be operated without the aid of a low voltage source. For example, U.S. Pat. No. 3,789,172, issued Jan. 29, 1974, to Cole et al, discloses a solenoid release spring trip mechanism for actuating a disconnect switch having an energy storing spring which, when fully charged, has sufficient capacity for three successive operations without recharging. After each switch operation, the spring is fully recharged by a motor connected to a low voltage source.

One object of the invention is to provide a high voltage switch that can interrupt load current and is capable of closing in on a fault, having an operating mechanism which can be controlled from a remote source and which includes stored energy means for providing several opening and closing operations of the switch.

It is a related object of the invention to provide a switch lockout means for maintaining the load break switch in its opened position whenever the stored energy is depleted to a preset cutoff value, to assure that whenever the load break switch is closed, there is always sufficient stored energy to open the switch.

It is another object of the invention to provide a compact and lightweight load break switch, having a fast contact opening and closing speed uneffected by icing or corrosion caused by low temperature or contaminated atmospheric conditions.

A further object of the invention is to provide means for manually operating the load break switch, and manually recharging the energy storage means.

Yet another object of the invention is to provide a switch with sensing means for indicating the existance of a fault through the switch when interrogated by an operator at a remote location, as well as a switch that can remotely indicate its status.

SUMMARY OF THE INVENTION

The load break switch described herein includes at least one vacuum interrupter which is electrically connected between two insulating bushing terminals through a current exchange assembly. The stationary contact rod of the vacuum interrupter is mechanically connected to the terminal carried at the end of the insulating bushing in which the vacuum interrupter is disposed. The moving contact rod of the vacuum interrupter extends through the spring loaded current exchange assembly in sliding contact therein, and is connected by an insulating rod to the operating mechanism for the vacuum interrupter. The current exchange assembly is encapsulated within an insulating housing, having portions which extend telescopically into both insulating bushings to provide adequate creepage distance in air between the vacuum interrupter and the current exchange assembly to the grounded switch housing. The use of this encapsulated current exchange assembly not only results in a lightweight compact load break switch, but also allows easy inspection and replacement of the vacuum interrupter.

The operating mechanism includes a torsion spring having a input end connected to a spring charging mechanism for charging the torsion spring to a predetermined energy level either manually or by a motor connected to a low voltage source which automatically recharges the torsion spring after each operation. The output end of the torsion spring is connected to an operating shaft through a torque sensing switch lockout mechanism which is only operative when the switch is in its open position, and which prevents the switch from being closed when the energy stored by the torsion spring falls below a predetermined value, to assure that the torsion spring always has enough stored energy to open the load break switch. The output end of the torsion spring is connected to rotate the operating shaft 180° during each operation of the switch between an open position and a closed position. Normally, the operating shaft is held in its open or closed position by a latching lever, which can be unlatched either manually, or by an remotely controlled electric solenoid. The rotary motion of the operating shaft is then converted to a reciprocating motion and used to operate the vacuum breaker. A current transformer, which is disposed about the periphery of the current exchange insulating housing that extends telescopically into the second bushing, is used to give remote indication of fault current flowing through the closed load break switch. Also, auxiliary switches, connected to the operating mechanism, can be used to provide remote indication of the opened or closed status of the load break switch.

The foregoing and other objects of this invention will become apparent in the following description and drawings.

BRIEF DESCRIPTION OF THE DRAWINGS

FIG. 10 is an electrical schematic diagram for the remotely operated electric solenoid of the operating mechanism shown in FIG. 4.

FIGS. 11, 12, and 13, are simplified vertical views of the lockout mechanism of the operating mechanism shown in FIG. 4, as viewed generally along the line 8—8 of FIG. 4, showing the position of the lockout mechanism when the load break switch is open and the torsion spring discharged, when the load break switch is open and the torsion spring is fully charged, and when the load break switch is closed, respectively.

DESCRIPTION OF A PREFERRED EMBODIMENT

Figure 1:
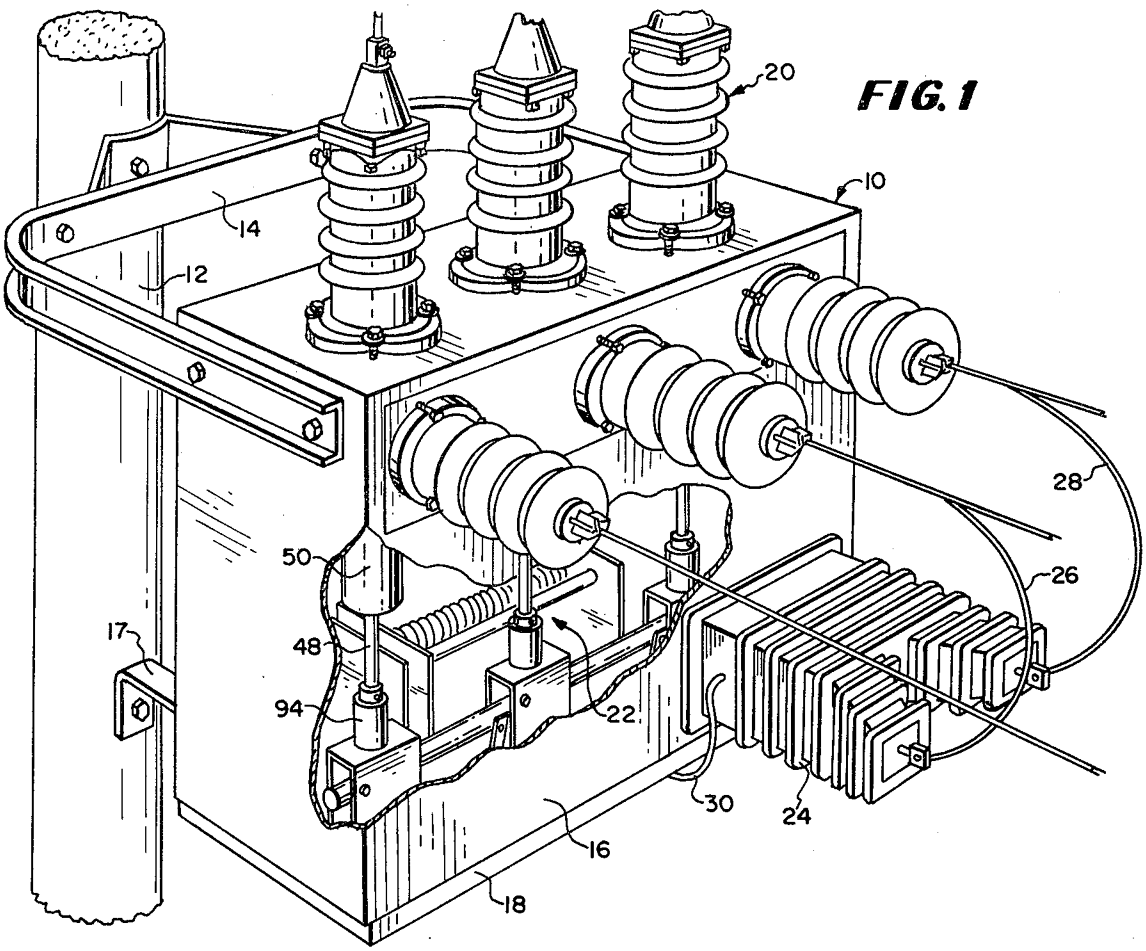
FIG. 1 is a perspective view of a three pole load break switch, in accordance with the invention described herein, which is shown mounted to an electric power pole.

FIG. 1 shows a 27 KV, 600 ampere, three phase load break switch 10 which is mounted to a power line pole 12 by an upper mounting member 14 bolted to opposite sides of a switch housing 16, and by a lower bracket member 17, which is bolted to a recessed bottom portion 18 of the switch housing 16. The switch 10 includes three vacuum interrupter and bushing assemblies 20, shown in better detail in FIG. 2, which are mounted to the top and front sides of the switch housing 16. A switch operating mechanism assembly 22 is mounted to the recessed bottom portion 18 of the switch housing 16. A potential transformer 24, for supplying power to the switch operating mechanism assembly 22, is mounted on the front side of the switch housing 16. One primary lead 26 of the transformer 24 is connected to one of the incoming phase lines of the power system, and another primary lead 28 of the transformer 24 is connected to another of the incoming phase lines. The transformer secondary power leads are brought out of the transformer 24 through a flexible conduit 30 through to a plug (not shown) which connects into a receptacle for the operating mechanism 22 in the recessed bottom section 18 of the housing 16.

Figure 2:
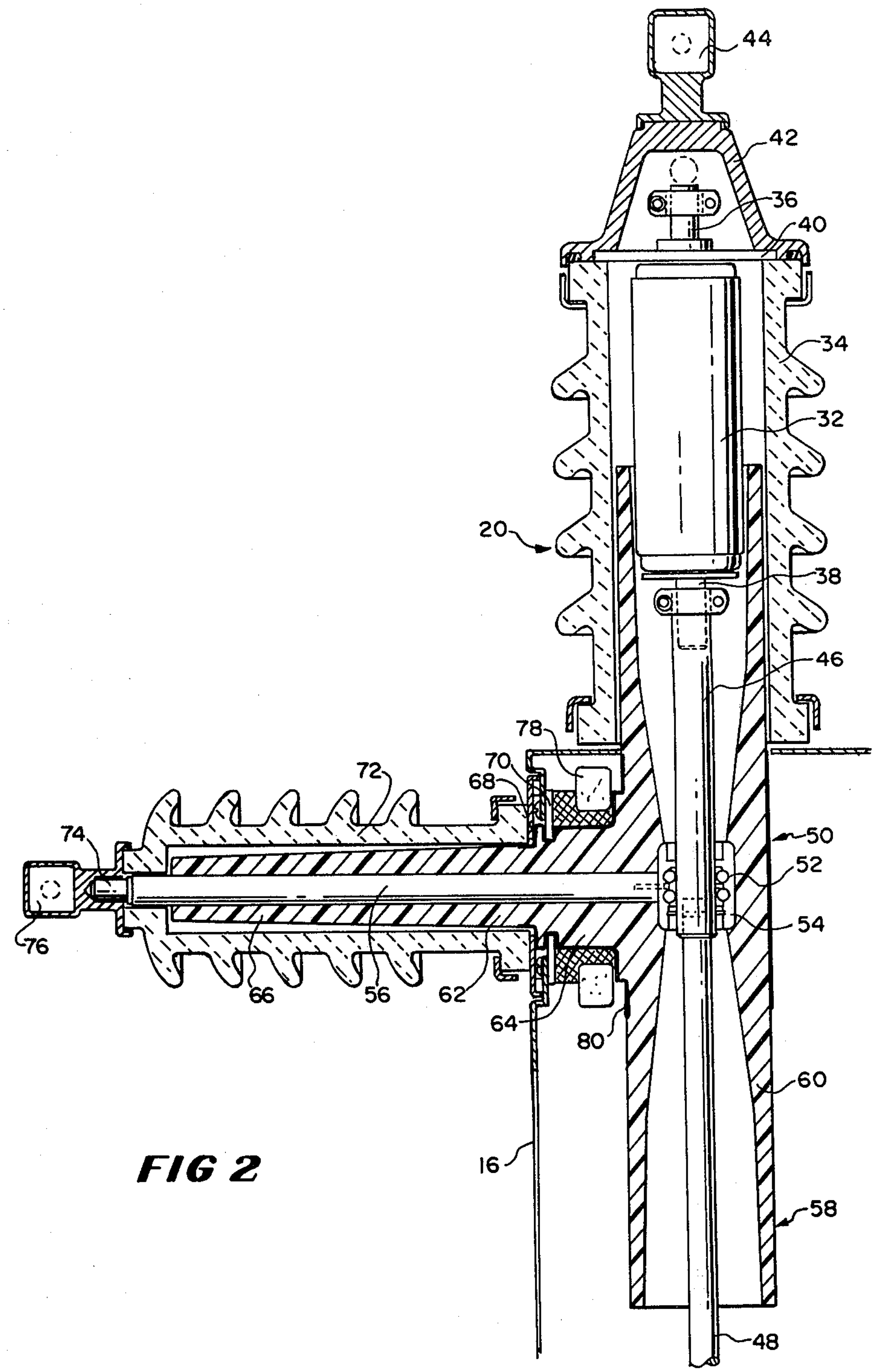
FIG. 2 is a vertical cross sectional view of one of the vacuum interrupter and bushing assemblies of the embodiment of the invention shown in FIG. 1.

The vacuum interrupter and bushing assembly 20 shown in FIG. 2 includes a vacuum interrupter 32 disposed within a porcelain bushing 34. The vacuum interrupter 32 includes a stationary contact rod 36 and a movable contact rod 38 movable along the axis of the vacuum interrupter 32 between a closed position where it engages the stationary contact rod 36, and an open position where it is disengaged and separated by a suitable distance from the stationary contact rod 36. A flange 40, carried by the stationary contact rod 36, is mounted to an electrically conductive metal bushing cap 42 carrying a terminal 44. A tubular moving contact rod extension 46 is connected at one end to the moving contact rod 38, and, at an opposite end, to an insulating rod 48.

The vacuum interrupter and bushing assembly 20 also includes an encapsulated current exchange assembly 50 which includes a pair of contact coil springs 52 secured within a conductive contact housing 54 and in encircling, sliding contact with the moving contact rod extension 46. The contact housing 54 has an internal diameter slightly larger than the outside diameter of the moving contact rod extension 46. The contact housing 54 includes annular recesses on its interior for positioning the individual contact coil springs 52 to project inwardly into supporting engagement with the tubular moving contact rod extension 46. A conductor rod 56, orthogonal to the axis of the vacuum interrupter 32 and the moving contact rod extension 46, is connected at one end to the contact housing 54. The conductor rod 56 and the contact housing 54 are partially embedded in a cast insulating housing 58 of the encapsulated current exchange assembly 50.

A cylindrical hollow portion 60 of the insulating housing 58, open at both ends, extends vertically along the axis of the vacuum interrupter 32 and the moving contact rod extension 46. The contact housing 54 is disposed at the midpoint of the hollow cylindrical portion 60 along the axis of the vacuum interrupter 32, so that the contact coil springs 54 are in sliding contact with the moving contact rod extension 46. The inner walls of the hollow cylindrical portion 60 are tapered inward near the center of the hollow cylindrical portion 60 so that the entire peripheral surface of the contact housing 54 is encircled by, and embedded in the insulating housing 58. The conductor rod 56 is embedded in another portion 62 of the insulating housing 58, which extends horizontally from the hollow cylindrical portion 60 through an opening in the front side of the housing 16 along the axis of the conductor rod 56. The portion 62 of the insulating housing 58 includes a cylindrical hub section 64 adjacent the hollow cylindrical portion 60, and an outer cylindrical section 66 of smaller diameter than the diameter of the hub section 64. The hub section 64 includes an annular slot 68 about its periphery for receiving split metal mounting plates 70, which are bolted or otherwise secured to the front wall of the housing 16, to thus mount the insulating housing 58 to the front wall of the housing 16. The outer section 66 extends into a porcelain side bushing 72 whose inner end is mounted to the housing 16 against the side of the cylindrical hub section 64. An outer threaded end 74 of the conductor rod 56 extends out of the insulating housing 58 through the outer end of the side bushing 72 to a side terminal 76. Also, a current transformer 78 is disposed about the cylindrical hub section 64 to sense current flowing through the conductor rod 56.

The hollow cylindrical portion 60 extends upward from the contact housing 54 into the top bushing 34 and about the lower portion of the vacuum interrupter 32, to thus insulate, and provide an adequate creepage path through air from the moving contact rod 38, the moving contact rod extension 46, and the contact housing 54 to the top of the switch housing 16. Similarly, the hollow cylindrical portion 60 of the insulating housing 58 extends downward from the contact housing 54 about the insulating rod 48, to thus insulate and provide adequate creepage distance through air from the contact housing 54 and the moving contact rod extension 46 to the front side of the switch housing 16. In like manner, the outer section 66 of the insulating housing 58, which extends into the side bushing 72, electrically insulates and provides an adequate creep distance through air between the conductor rod 56 and the front side of the switch housing 16. Thus, the use of the insulating housing 58 allows the top bushing 34 and the side bushing 72 to be closely spaced near the common edge of the top and front side of the switch housing 16, to provide a simple, compact, and light-weight load break switch.

Any known procedure may be used in molding the encapsulated current exchange assembly 50 which will produce a physically strong electrically insulating housing 58. The insulating housing 58 may be of any suitable epoxy resin or other solid insulating material, and may be reinforced with appropriate additives such as glass or mica. For example, a basic Bisphenol-A epoxy having inert fillers such as silica and Wolanstonite to improve its mechanical and electrical properties may be used.

A conductive coating 80 is applied about the outer periphery of the hub portion 64 and the adjacent parts of the cylindrical portions 60 and 62 to reduce the voltage gradient at the adjoining edges of these portions 60, 62, 64 and within the annular slot 68.

Figure 4:
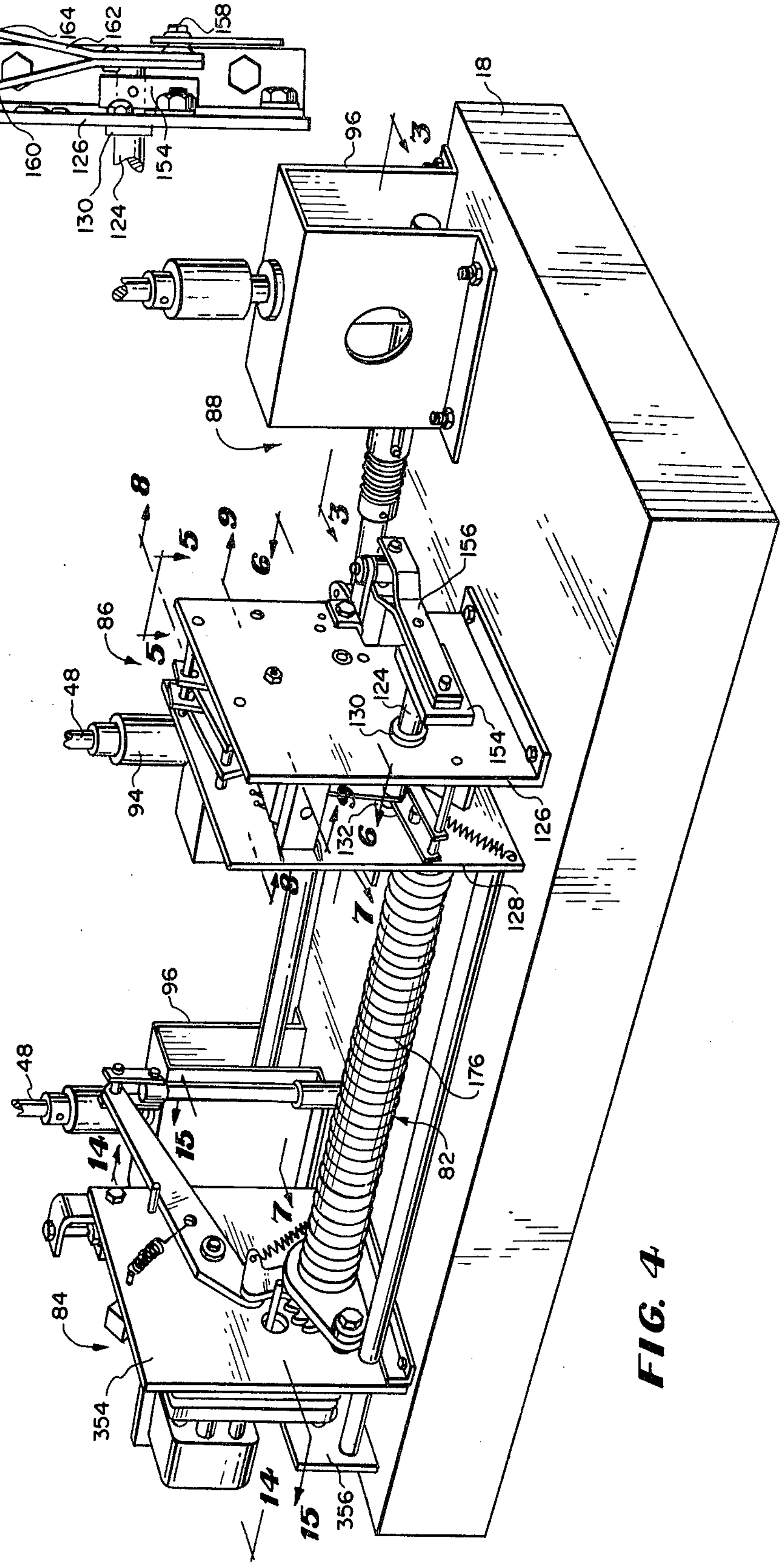
FIG. 4 is a perspective view of the operating mechanism for the three pole load break switch of FIG. 1.

The switch operating mechanism assembly 22, shown in FIG. 4, includes an operating spring assembly 82, a spring charging mechanism 84, an operating shaft and latch assembly 86, and a pole mechanism 88.

Figure 3:
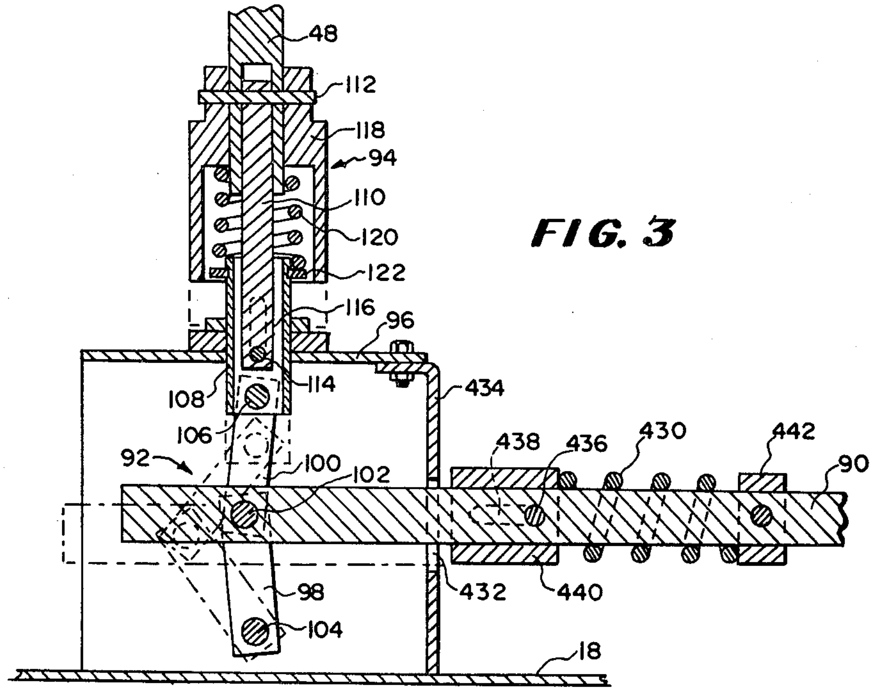
FIG. 3 is a vertical cross-sectional view of the toggle linkage connected between each vacuum interrupter and the operating mechanism of the embodiment of FIG. 1, shown in its closed position.

The pole mechanism 88 includes an operating rod 90 which is axially movable between a closed and an open position as shown in FIG. 3. The operating rod 90 is connected to the insulating rod 48 of each vacuum interrupter and bushing assembly 20 through a toggle linkage 92 and a contact loading spring assembly 94 associated with each phase, to simultaneously open and close each vacuum interrupter 32. The toggle linkages 92 and contact loading springs assemblies 94 are similar to the toggle linkages and contact loading spring assemblies disclosed in U.S. Pat. No. 3,955,167, issued May 4, 1976 to Kazuo Henry Date, one of the present joint inventors, and assigned to the same assignee as this application. The operating rod 90, and one of the toggle linkages 92 together with its associated contact loading spring assembly 94 is shown in the closed position in FIG. 3. Also, the open position is indicated by dashed lines in FIG. 3.

Each toggle linkage 92 includes an open ended rectangular bracket 96 which is suitably affixed at its bottom to the recessed bottom portion 18 of the switch housing 16. The operating rod 90 extends through the open ends of the brackets 96 and is pivotally connected to one end of a first link 98 and to one end of the second link 100 by a pivot pin 102. The opposite end of the first link 98 is pivotally connected to the bracket 96 by a pin 104. The opposite end of the second link 100 is pivotally connected by a pin 106 to the lower end of a sleeve 108 of the contact loading spring assembly 94, which extends upward through an opening in the top of the bracket 96.

The contact loading spring assembly 94 includes a stem 110 affixed by a pin 112 in a telescopic relation to the lower end of the insulating rod 48. The stem 110 extends downwardly from the insulating rod 48 into the sleeve 108, to which it is connected by a pin 114 which extends through the stem 110 and into slots 116 formed in opposite sides of the sleeve 108. The pin 112 is also used to affix a cylindrical cup-shaped member 118, open at its lower end, in a telescopic relation to the lower end of the insulating rod 48. A contact pressure spring 120 surrounds the stem 110 and extends between the closed inner end of the cup-shaped member 118 and a washer 122 mounted at the top end of the sleeve 108.

Figure 5:
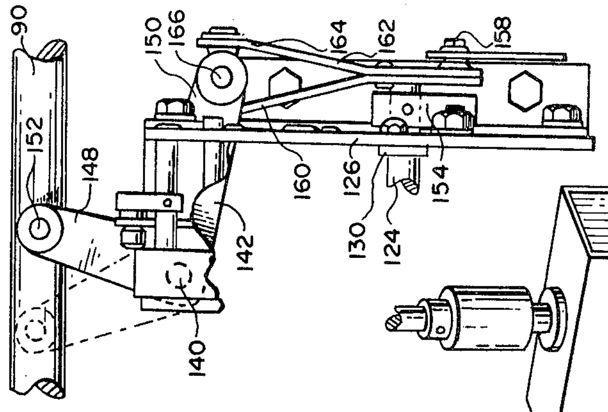
FIG. 5 is a fragmentary top view of the operating mechanism of FIG. 4, taken generally along the line 5—5 of FIG. 4, showing the bell crank and lever assembly for converting the rotary motion of the operating shaft to the reciprocating motion of the pole mechanism.
Figure 6:
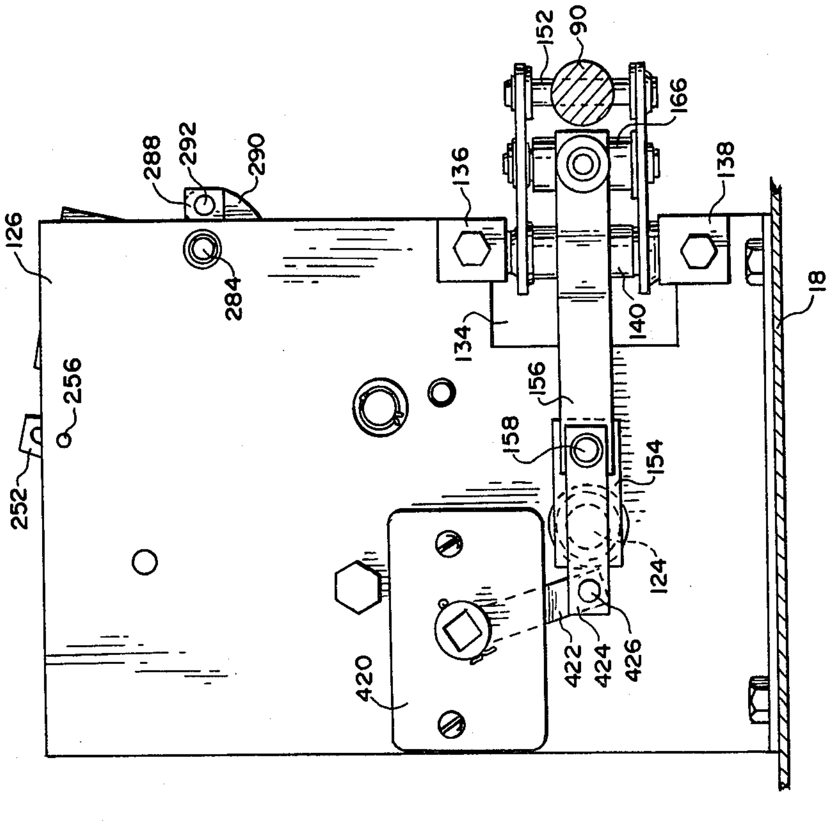
FIG. 6 is a fragmentary sectional view of the operating mechanism of FIG. 4, taken generally along the line 6—6 of FIG. 4.

As shown in FIGS. 4–6, the operating shaft and latch assembly 86 includes an operating shaft 124 which extends horizontally through two vertically disposed support plates 126 and 128 affixed to the recessed bottom portion 18. The operating shaft 124 is mounted for rotation about its axis by a needle bearing 130 carried by the support plate 126 and by another needle bearing 132 carried by the support plate 128.

The sides of the vertical mounting plates 126 and 128 adjacent the horizontally extending operating rod 90 each have a rectangular shaped recess 134 therein to define mounting surfaces for an upper mounting bracket 136 and a lower mounting bracket 138, each of which extend horizontally between the two vertical mounting plates 126 and 128. Each of the horizontal mounting brackets 136 and 138 have vertically extending end portions which are bolted to the adjacent one of the vertical mounting plates 126 or 128. A fixed, vertically extending, pivot pin 140 is affixed at its top end to the upper mounting bracket 136, and at its bottom end to the lower mounting bracket 138. A bell crank 142, which is pivotal about the fixed pin 140, is comprised of two identical, spaced-apart, plates 144 and 146, which form two yoke arms 148 and 150 of the bell crank 142. The operating rod 90 is pivotally connected between the two sides of the yoke arm 148 of the bell crank 142 by a pin 152 which extends vertically between the eyes of the yoke arm 148. The two plates 144 and 146 forming the bell crank 142 are spaced apart by a distance considerably greater than the diameter of the operating rod 90, to allow limited vertical movement of the operating rod 90 along the pin 152.

One end of a crank arm 154, affixed to the output end of the operating shaft 124, is pivotally connected to one end of a link 156 by a pivot pin 158. The link 156 is comprised of two plates 160 and 162, which are spaced apart at the opposite end of the link 156 to form an end yoke 164. A cross-shaped, universal coupling member 166 is pivotally connected with the end yoke 164 of the link 156 for pivotal movement about its horizontal axis. The cross-shaped member 166 is also pivotally connected with the yoke arm 150 of the bell crank 152 for pivotal movement about its vertical axis. The link 156, the cross-shaped member 166, and the yoke arm 150 of the bell crank 142 thus form a universal coupling linkage which translates the circular movement of the crank arm 154 in a vertical plane to a pivotal movement of the bell crank 142 in a horizontal plane.

When the load break switch 10 is open, the operating shaft 124 is positioned so that the pivot pin 158 carried by the crank arm 154 is at a maximum distance from the axis of the pin 140 about which the bell crank 142 rotates, as shown in FIG. 5 Also, the toggle linkage 92 is in its retracted position as shown by dashed lines in FIG. 3. When the switch 10 is then closed, the operating shaft 124 is rotated 180° in one direction to position the pivot pin 158 at its closest point to the axis of the pin 140, and the bell crank 142 is rotated to its closed position, as shown by dashed lines in FIG. 5. This rotation of the bell crank 142 causes the operating rod 90 to move in an axial direction which will cause the toggle linkage 92 to be extended and move the moving contact rod 38 of each vacuum interrupter 32 into engagement with the stationary contact rod 36, as shown in FIG. 2.

When the load break switch 10 is opened, the operating shaft 124 is again rotated 180° in the same direction that the shaft was rotated during a closing operation of the load break switch 10. However, the remainder of the linkage elements connected between the operating shaft 124 and the moving contact rod 46 of each vacuum interrupter 32 will be moved in a reverse direction to return these elements to their open position.

Figure 7:
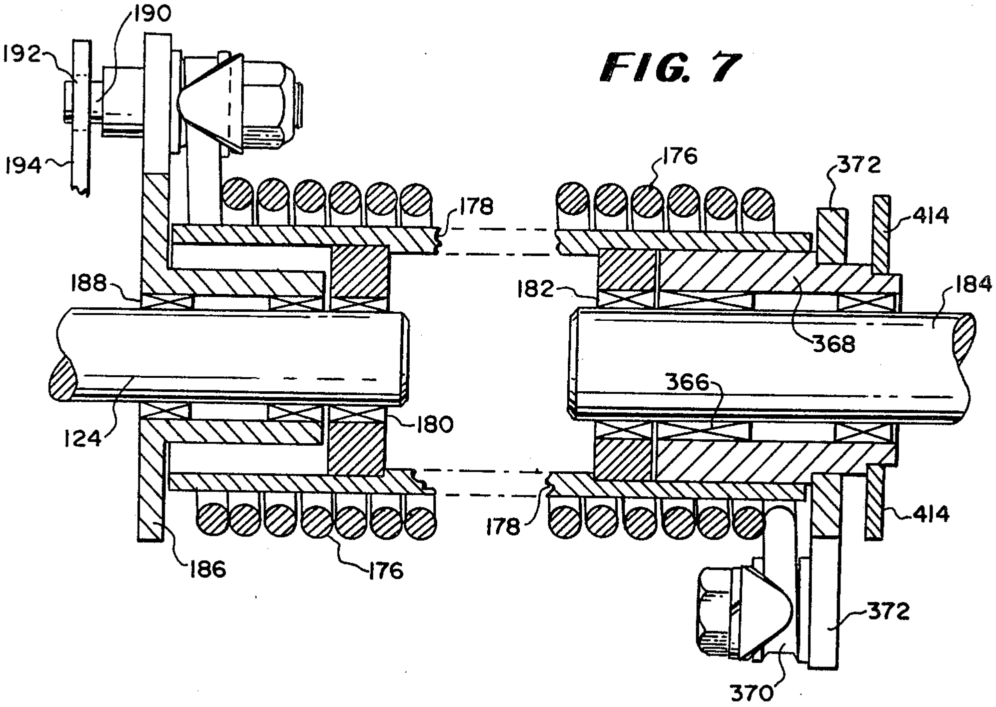
FIG. 7 is a simplified cross-sectional view of the operating spring assembly for the operating mechanism shown in FIG. 4, taken generally along the line 7—7 of FIG. 4.

As shown in FIG. 7, the operating spring assembly 82 includes a torsion spring 176, disposed about a tubular member 178 which is freely supported at one end by a needle bearing 180 carried by the operating shaft 124, and at an opposite end by another needle bearing 182 carried by an output shaft 184 of the spring charging mechanism 84. The output end of the torsion spring 176 is connected to a flange 186 which is also freely supported for rotational movement about the operating shaft 124 by a needle bearing 188.

A pin 190, affixed to the flange 186, extends through an opening 192 in a cam lever 194.

Figure 9:
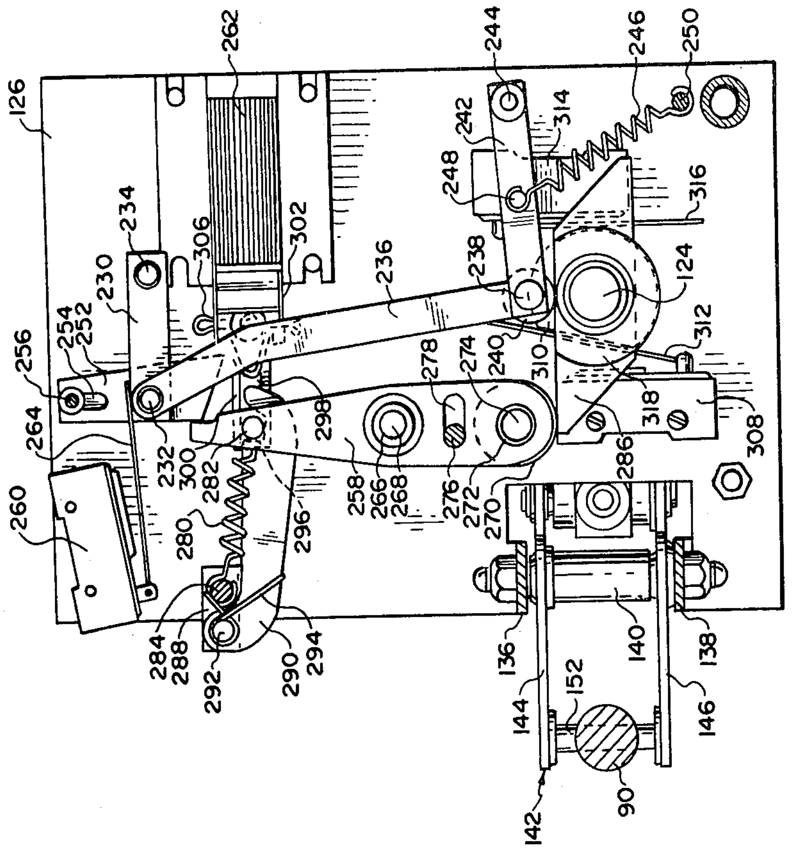
FIG. 9 is a fragmentary sectional view of the operating mechanism of FIG. 4, taken generally along the line 9—9 of FIG. 4.
Figure 8:
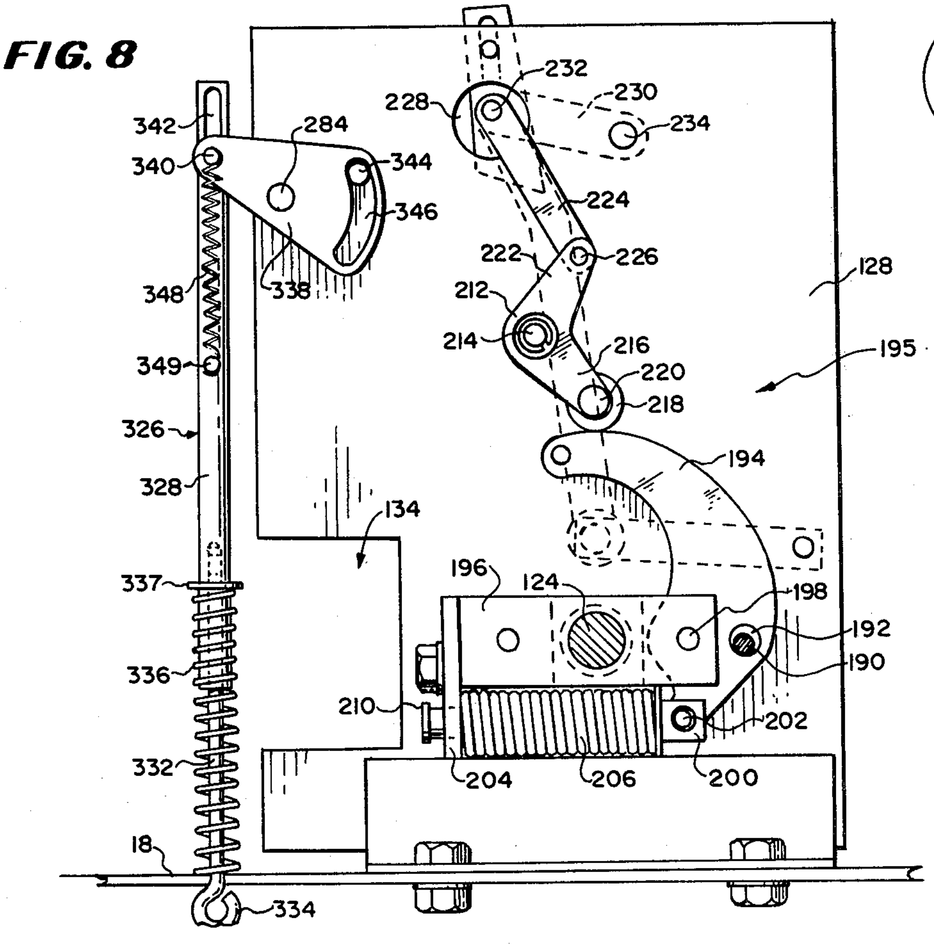
FIG. 8 is a fragmentary sectional view of the operating mechanism of FIG. 4, taken generally along the line 8—8 of FIG. 4.

The operating shaft and latch assembly 86 includes a lockout mechanism 195, shown in FIGS. 8 and 9, to assure that, when the load break switch 10 is closed, the torsion spring 176 will have sufficient stored energy to open the load break switch 10. The lockout mechanism 195 includes the cam lever 194, which is pivotally connected to a bracket 196 carried by the operating shaft 124 by a pivot pin 198. The cam lever 194 is also pivotally connected to one end of a spring-loaded rod 200 by a pin 202. The opposite end of the rod 200 extends through an opening in an offset portion 204 of the bracket 196, in sliding contact therein. A spring 206, disposed about the rod 200, exerts a force between the offset portion 204 of the bracket 196 and a flange 208 which is affixed to the rod 200, which tends to move the rod 200 to the right as shown in FIG. 8, until further movement of the rod 200 is prevented by a lock washer 210 disposed on the end of the rod 200 that extends through the offset portion 204. Since the bracket 196 is affixed to the operating shaft 124 and the cam lever 194 and the spring-loaded rod 200 is connected to the bracket 196, the entire assembly of the cam lever 194, the bracket 196, and the spring-loaded rod 200, rotates with the operating shaft 124.

A bell crank 212, which is pivotally connected to the support plate 128 by a pin 214, has one arm 216 which is pivotally connected to a roller 218 by a pin 220, and another arm 222 which is pivotally connected to one end of a link 224 by a pin 226. The opposite end of the link 224 is pivotally connected through an opening 228 in the support plate 128 to one end of link 230 by a pin 232 as also shown in FIG. 9. The opposite end of the link 230 is pivotally connected to the support plates 126 and 128 by a pin 234. The link 230 thus restricts the movement of the pin 232 to a circular arc about the pin 234. The links 224 and 230 are also pivotally connected to one end of another link 236 by the pin 232. The opposite end of the ink 236 is pivotally connected by a pin 238 to a roller 240 and also to one end of a link 242. The opposite end of the link 242 is pivotally connected to the support plate 126 by a pin 244. The link 242 thus restricts the movement of the pin 238 to a circular arc about the pin 244. One end of a spring 246 is connected to a middle portion of the link 242 by a pin 248, and the other end of the spring 246 is connected to the support plate 126 by a pin 250. The spring 246, as seen in FIG. 9, exerts a counter clockwise rotational force on the link 242.

When the operating shaft 124 is latched in its open position, as explained hereinafter, the cam lever 194 extends upward from the bracket 196, as shown in FIG. 8. The spring 246 exerts a clockwise rotational force on the bell crank 222, as seen in FIG. 8, through the two connecting links 236 and 224, to position the roller 218 in rolling contact with the cam lever 194. Thus, the force exerted by the spring 246 through the roller 218 and the force exerted by the spring 206 through the pin 202 tend to rotate the cam lever 194 downward in a counter-clockwise direction about the pivot pin 198, whereas the force produced by the spring 176 through the pin 190 tends to rotate the cam lever 194 upward in a clockwise direction about its pivot pin 198. When the force exerted on the cam lever 194 by the torsion spring 176 becomes greater than the opposing force exerted on the cam lever 194 by the springs 246 and 206, the cam lever 194 is rotated in a clockwise direction, the bell crank 212 is rotated in a counter-clockwise direction, and the link 230 is rotated in a clockwise direction to move the pin 232 upward. Similarly, when the force exerted by the springs 246 and 206 becomes greater than the force exerted by the torsion spring 176, the cam lever 194 is rotated in a counter-clockwise direction, the bell crank 212 in a clockwise direction, and the link 230 in a counter clockwise direction, to move the pin 232 downward.

As best seen in FIG. 9, a lockout latch 252, which is pivotal about the pin 232, includes a slot 254 at its upper end through which a pin 256 affixed to the support plates 126 and 128 extends. When the pin 232 is in its lower position, the lower end of the lockout latch 252 is positioned by the pins 232 and 256 adjacent to an upper side of a main latch lever 258, to lock the main latch lever 258 in its latched position. When the pin 232 is rotated about the pin 234 to its upper position, the lockout latch 252 is moved upward and away from the main latch lever 258 to allow this main latch lever 258 to be moved from its latched position, as explained hereinafter.

Since the only purpose of the spring 246 is to assure that the roller 218 is always held in rolling contact with the cam lever 194 whenever the switch 10 is open, the force exerted by the spring 246 on the cam lever 194 is very small compared to the forces exerted on the cam lever 194 by the torsion spring 176 or the spring 206. Also, since both ends of the spring 206 is connected to the bracket 196 carried by the operating shaft 124, the spring 206 exerts no rotational force on the operating shaft 124. However, the torsion spring 176 will exert a force on the operating shaft 124 which acts to rotate the operating shaft 124 in a clockwise direction as viewed in FIG. 8 or FIG. 9. When fully charged, the torsion spring 176 is capable of opening and closing the load break switch 10 at least several times before the energy stored in the torsion spring 176 is so depleted that the spring 176 is incapable of either opening or closing the load break switch 10. To prevent the possibility that the load break switch 10 cannot be opened because of failure to recharge the torsion spring 176, the spring 206 is designed to move the lockout latch 252 downward to mechanically lock the main latch lever 258 in its latched position, when the load break switch 10 is open, and while the torsion spring 176 still has enough stored energy to close, and then reopen, the load break switch 10.

The lockout mechanism 195 also includes a normally-open lockout limit switch 260 which is connected in series with an electric solenoid 262 which is actuated to initiate the closing or opening operation of the load break switch 10. The lockout limit switch 260 is mounted to the support plate 126 so that its spring-loaded operating lever 264 contacts the top side of the link 230 adjacent the pin 232. When the torsion spring 176 is fully charged and the pin 232 is disposed in its upper position, the lockout limit switch 260 is closed to allow the solenoid 262 to be energized. When the torsion spring is discharged to the point that the pin 232 and the lockout latch 252 has moved downward to mechanically lock the main latch lever 258 in its latched position, the lockout limit switch 260 is opened to prevent energization of the solenoid 262.

Normally the torsion spring 176 is fully recharged after each closing or opening operation of the load break switch 10, and the lockout latch 252 will remain in its upper position out of engagement with the main latch lever 258 when the load break switch 10 is open, as shown schematically in FIG. 12. The main latch lever 258 is pivotally connected by a needle bearing 266 to a pin 268 affixed to the support plate 126. A roller 270 is pivotally connected by a needle bearing 272 to a pin 274 affixed to the main latch lever 258. A stop pin 276, which is affixed to the support plate 128 and which extends through a slot 278 in the main latch lever 258 intermediate the pins 268 and 274, limits the angular rotation of the main latch lever 258 about the fixed pivot pin 268. One end of a latch return spring 280 is attached to a pin 282 affixed to the upper end of the main latch lever 258. The opposite end of the latch return spring 280 is attached to a pin 284 which is pivotally connected to the support plates 126 and 128. The latch return spring 280 exerts a force on the pin 282 of the main latch lever 258, to hold the stop pin 276 against one side of the slot 278. When the main latch lever 258 is in its latched position and the operating shaft 124 in its open position, as shown in FIG. 9, the operating shaft 124 is held in its open position by the roller 270 which bears against one side of a double-ended lever 286 affixed to the operating shaft 124 and prevents the torsion spring 176 from rotating the operating shaft 124. One end of a lever 288 is affixed to the pin 284. The other end of the lever 288 is pivotally connected to one end of another lever 290 by a pin 292. A torsion spring 294, disposed about the pin 292, has one end held by the pin 284, and an opposite end connected at the bottom side of the lever 290. The torsion spring 294 exerts a force on the lever 290 which tends to rotate the lever 290 in a counter-clockwise direction, as seen in FIG. 9, about the pin 292, to press the upper side of the lever 290 against the pin 282 of the main latch lever 258 within a notch 296 of the lever 290.

The pin 282 of the main latch lever 258 extends into a slot 298 formed in one end of a link 300. The opposite end of the link 300 is pivotally connected to the end of an armature 302 of the electric solenoid 262 by a pin 306. When the solenoid 262 is energized, the armature 302 will pull on the pin 282 and start to rotate the main latch lever 258 in a clockwise direction. The force which must be exerted by the solenoid 262 is minimized due to the use of the needle bearings 266 and 272 at the pivot pins 268 and 274. When the main latch lever 258 is in its latched position, the force exerted by the torsion spring 176 through the lever 286 on the main latch lever 258 will act in a radial direction against the pivot pin 268. However, as soon as the main latch lever 258 is rotated only slightly from its latched position, part of the force exerted by the torsion spring 176 on the main latch lever 258 will act in a tangential direction about the pivot pin 268 to further rotate the main latch lever 258 in a clockwise direction. The lever 286 of the operating shaft 124 will start to rotate in a clockwise direction as seen in FIG. 9, and the tip end of the lever 286 will exert a force against the roller 270 to rotate the main latch lever 258 in a clockwise direction until the stop pin 276 hits the other side of the slot 278. As the lever 286 starts to rotate, the solenoid 262 is de-energized by a normally-closed limit switch 308, as described hereinafter. As the lever 286 further rotates, the main latch lever 258 is immediately turned to its original latched position by the latch return spring 280, and stops the opposite end of the lever 286 after the lever 286 has rotated 180° in a clockwise direction to its closed position.

A cam 310, carried by the operating shaft 124, has a peripheral cam surface which is circular in shape and concentric with the operating shaft 124 except for one flat portion. The limit switch 308 is mounted to the support plate 126 so that its spring loaded operating lever 312 is held in sliding contact with the periphery of the cam 310. When the operating shaft 124 is latched in its opened position, as shown in FIG. 9, the operating lever 312 of the limit switch 308 extends outward against the flat surface of the cam 310 and the limit switch 308 is closed. When the operating shaft 124 is unlatched and starts to rotate towards its closed position, the operating lever 312 is rotated counter-clockwise by the circular portion of the cam 310 to open the limit switch 308. After the operating shaft 124 has been rotated 180° to its closed position and has been relatched, the limit switch 308 is maintained in its opened position by the cam 310. Thus, the limit switch 308 is only closed when the operating shaft 124 is latched in its opened position.

Another normally-closed limit switch 314, which is also mounted on the support plate 126 and has a spring loaded operating lever 316 which is actuated by the cam 310, is mounted on an opposite side of the cam 310 so that the cam 310 will allow the limit switch 314 to close only when the operating shaft 124 is in its latched closed position.

Another cam 318, similar in shape to the cam 310, is affixed to the operating shaft 124 adjacent the roller 240 pivotal about the pin 238, with the flat surface of the cam 318 being parallel to the latching sides of the lever 286. As shown in FIG. 11, when the operating shaft 124 is latched in its opened position, and the torsion spring 176 is discharged, the roller 240 is held against the flat surface of the cam 318 by the spring 246, to thus determine the lowest locking position of the lockout latch 252. When the torsion spring 176 is fully charged, the upper, unlatched position of the lockout latch 252 will be determined by the cam lever 194, as shown in FIG. 12.

The operating shaft 124 is latched in its open position, and the main latch lever 258 is unlatched by the solenoid 262 to initiate the rotation of the operating shaft 124 towards its closed position, as the cam 318 carried by the operating shaft 124 begins to rotate, it will move the roller 240 upward, which in turn causes the lockout latch 252 to move upward to its unlatched position. After the operating shaft 124 is rotated 180° to its closed position and has been relatched, the circular portion of the cam 318, against which the roller 240 rests, will maintain the lockout latch 252 in its upward unlatched position, as shown in FIG. 13. When the operating shaft 124 is again unlatched and further rotated another 180° to its open position and again latched, the flat portion of the cam 318 is again positioned adjacent the roller 240, and the position of the lockout latch 252 will be determined by the cam lever 194. In this way, the lockout mechanism 195 is only operative when the operating shaft 124 is latched in its open position.

As shown schematically in FIG. 10, the solenoid 262 is connected in series with the lockout limit switch 260 and the limit switch 314 between a trip terminal 320 and a common terminal 322; the solenoid 262 is also connected in series with the lockout limit switch 260 and the limit switch 308 between a closed terminal 324 and the common terminal 322. When the load break switch 10 is closed, the cam 310 maintains the limit switch 314 closed and the limit switch 308 open, and the cam 318 maintains the lockout limit switch 260 closed. If a tripping signal is then applied to the trip terminal 320, the solenoid 262 will be energized through the closed lockout limit switch 260 and the closed limit switch 314 to initiate opening of the load break switch 10; however, a closing signal applied to the close terminal 324 will not energize the solenoid 262, since the limit switch 308 is open. When the load break switch 10 is open, the cam 310 maintains the limit switch 308 closed and the limit switch 314 opened. The lockout limit switch 260 can be either opened or closed, depending on the quantity of energy stored by the torsion spring 176. If a closing signal is then applied to the close terminal 324, the solenoid 262 will be energized to initiate closing of the load break switch 10 only if the torsion spring 176 is sufficiently charged to close, then reopen, the load break switch 10. If a trip signal is received at the trip terminal 320 when the load break switch 10 is already open, the solenoid 262 will not be energized since the limit switch 314 is open.

The operating shaft and latch assembly 86 also includes a manual trip mechanism 326, shown in FIGS. 8 and 9. The lower end of a rod 328 is affixed to another rod 332, having a smaller diameter than the rod 328, which extends downward through an opening in the bottom portion 18 of the switch housing 16. The lower end of the rod 332 which extends outside of the switch housing 16 is shaped to form a pull ring 334. A spring 336, disposed about the rod 332 exerts a force between a collar 337 carried by the rod 328 and the switch housing bottom portion 18 to hold the rods 328 and 332 in an upward position. A lever 338, affixed to the pin 284, carries at one end a pin 340 which extends through a slot 342 formed at the upper end of the rod 328. A stop pin 344 is affixed to the support plate 128 and extends through an arcate-shaped slot 346 in the lever 338 to limit the pivotal movement of the lever 338 about the pin 284. A spring 348, is connected at one end to the pin 340, and at an opposite end, to a pin 349 affixed to a central portion of the rod 328. The spring 336 exerts a force on the rod 328 to hold the lower end of this slot 342 against the pin 340, and also to hold the upper end of the slot 346 and the lever 338 against the stop pin 344.

When the ring 334 is manually pulled downward, the lever 338 is rotated in a counter-clockwise direction until the stop pin 344 strikes the lower end of the slot 346. Consequently, the lever 288, shown in FIG. 9, which is also affixed to the pin 284, is also rotated in a counter-clockwise direction when the ring 334 is pulled downward. When the lever 288 is rotated counter-clockwise, the lever 290, which is pivotally attached to the lever 288 by the pin 292 and has a notched portion 296 which is engaged with the pin 282 carried by the main latch lever 258, is moved so that it pushes against the pin 282 of the main latch lever 258, to rotate the main latch lever 258 in a clockwise direction. As soon as the main latch lever 258 starts to rotate, the lever 286 causes further rotation of the main latch lever 258 so that the pin 282 rides over the sloped end of the lever 290 and finally disengages completely from the lever 290, so that the main latch lever 258 can freely return to its latched position.

Figure 14:
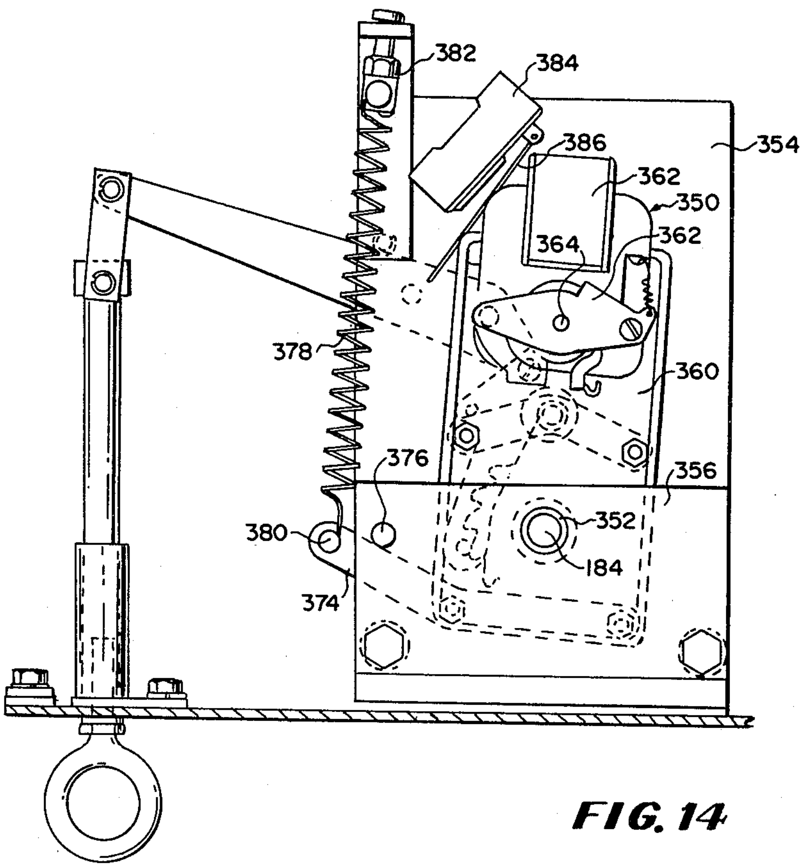
FIGS. 14 and 15 are fragmentary sectional views of the operating mechanism of FIG. 4, taken generally along the lines 14—14 and 15—15 of FIG. 4, respectively.

Referring now to FIG. 14, the spring charging mechanism 84 includes a geared motor assembly 350 having an output shaft 184 which is pivotally supported by needle bearings 352 carried by vertical support plates 354 and 356, which are bolted to the switch housing bottom portion 18. A motor 358 of the geared motor assembly 350 is integrally mounted to a gear train housing 360. A ratchet and pawl assembly 362, connected between the motor shaft 364 of the motor 358 and the gear housing 360, allows the motor shaft 364 to rotate in only one direction relative to the gear housing 360. As shown in FIG. 7, one end of the tubular member 178 is freely supported by the needle bearing 182 carried by the output shaft 184. The output shaft 184 also has a roller clutch 366 positioned between the output shaft 184 and a sprocket housing 368 to rotate the input end of the torsion spring 176 in a clockwise direction when the motor 358 is energized. The input end of the torsion spring 176 is fastened to a pin 370 carried by a flange 372 affixed to the sprocket housing 368.

As seen in FIG. 14, an extended lever 374 is affixed to the lower end of the gear housing 360. The gear motor assembly 350 is prevented from rotating in a clockwise direction by the extended lever 374, which engages a stop pin 376 affixed to, and extending between, the support plates 354 and 356. A torque limiting extension spring 378 is connected between one end of the extended lever 374 and the support plate 354 to exert a force on the geared motor assembly 350 to hold the extended lever 374 against the stop pin 376. The lower end of the spring 378 is attached to a pin 380 carried by the extended lever 374. The upper end of the spring 378 is attached to the support plate 354 by a threaded bolt and nut assembly 382 carried by the plate 354, which can be adjusted to control the torque exerted by the spring 378 on the geared motor assembly 350.

The motor 358 is energized through a normally closed motor limit switch 384, which is mounted to the support plate 354, with its spring loaded operating lever 386 engaging the gear housing 360.

When the torsion spring 176 is discharged, the torque limiting extension spring 378 will hold the extended lever 374 of the geared motor assembly 350 against the stop pin 376, and the motor limit switch 384 will close to energize the motor 358. When the motor 358 is energized, the output shaft 184 will rotate the input end of the torsion spring 176 clockwise until the torsional force applied by the geared motor assembly 350 to the input end of the torsion spring 176 becomes greater than the torsional force applied by the torque limiting spring 378 to the geared motor assembly 350. When this occurs, the geared motor assembly 350 will start to rotate about the output shaft 184 in a counter-clockwise direction. As the geared motor assembly 350 rotates counter-clockwise, the operating lever 386 of the motor limit switch 384 will be rotated in a clockwise direction by the gear housing 360. The torque limiting spring 378 and the motor limit switch 384 are adjusted so that when the torsion spring 176 is fully charged, the motor limit switch 386 will open and deenergize the motor 358. Since the motor shaft 364 is prevented by the ratchet and pawl assembly 362 from rotating in a reverse direction, the torque exterted by the fully charged torsion spring 176 through the sprocket housing 368, the roller clutch 366, the output shaft 184, the gear train of the geared motor assembly 350, the motor shaft 364 and the ratchet and pawl assembly 362 will act on the gear housing 360 to prevent the torque limiting spring 378 from rotating the geared motor assembly 350 clockwise and allowing the motor limit switch 384 to close and again energize the motor 358.

Whenever a portion of the energy stored in the torsion spring 176 is used for an opening or closing operation of the load break switch 10, the gear housing 360 is automatically moved clockwise by the torque limiting spring 378 to close the motor limit switch 382 and energize the motor 358 for reloading the lost energy into the torsion spring 176. Thus, as long as a source of low voltage power is available, the motor 358 will automatically restore the energy in the torsion spring 178 to its maximum preset torque or starting position.

Figure 15:
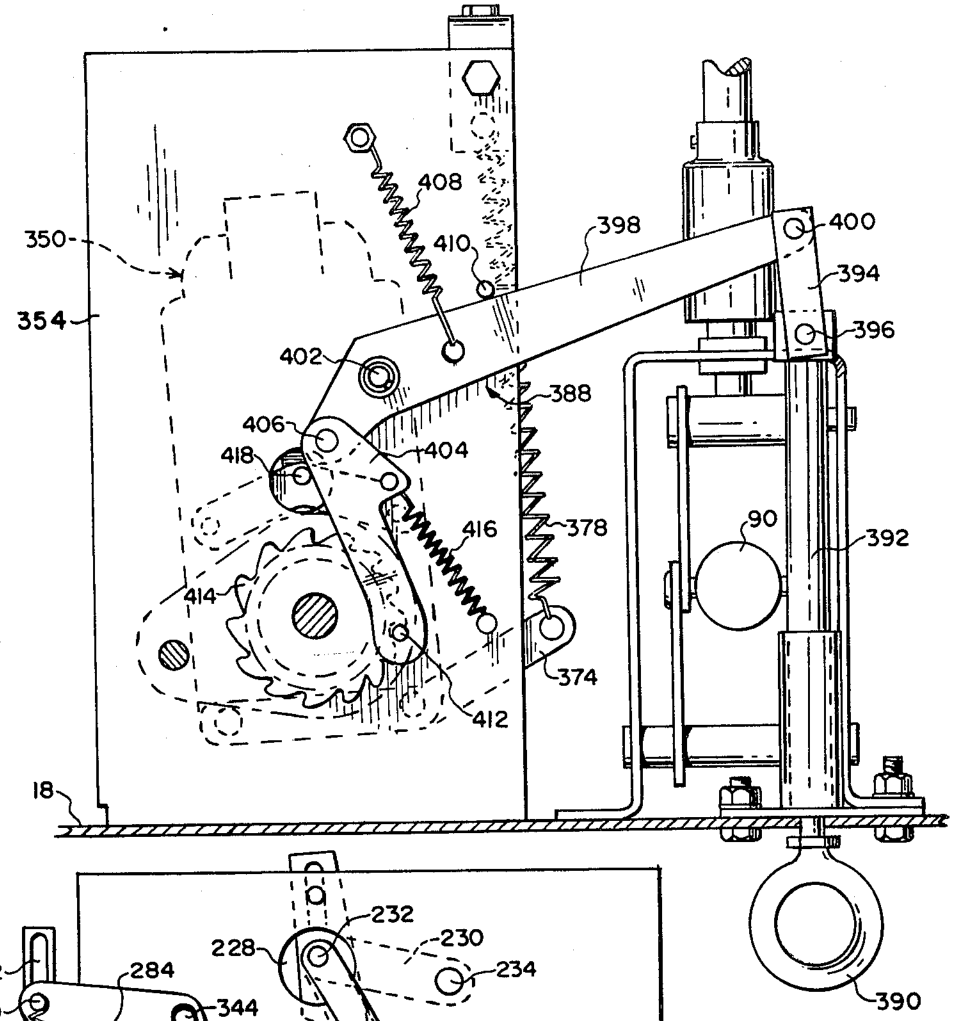

The spring charging mechanism 84 also includes a ratchet and pawl mechanism 388, shown in FIG. 15, for manually storing the energy in the torsion spring 176 whenever the source of low voltage power is lost and the stored energy in the spring 176 is expended. The ratchet and pawl assembly 388 is operated by pulling downward on a pull ring 390 which extends through the switch housing bottom portion 18, and is attached to the lower end of a rod 392. One end of a connecting link 394 is pivotally attached to the upper end of the rod 392 by a pin 396, and the other end of the connecting link 394 is pivotally attached to one end of a lever 398 by a pin 400. The lever 398 is pivotally attached to the support plate 354 by a pin 402. The opposite end of the lever 398 is pivotally attached to a pawl 404 by a pin 406. A spring 408, which is connected between the support plate 354 and the lever 398, exerts a force on the lever 398 to rotate the lever 398 counter-clockwise about its pivot pin 402 and hold the lever 398 against a stop pin 410 affixed to the support plate 354. A pin 412, affixed to the opposite end of the pawl 404, is held in engagement with the sprocket teeth of a ratchet wheel 414 affixed to the sprocket housing 368 by a spring 416, which is connected between the pawl 404 and the support plate 354 to exert a force on the pawl 404 tending to rotate the pawl 404 clockwise about the pivot pin 406. A pin 418, affixed to the geared motor assembly 350, extends through an opening in the support plate 354 adjacent one side of the pawl 404. Also, as discussed above, the input end of the torsion spring 176 is connected to the ratchet housing 368.

Each time the pull ring 390 is pulled, the lever 398 is rotated in a clockwise direction to drive the pawl 404 and ratchet the torsion spring 176 in a clockwise direction. Approximately 24 to 32 ratcheting or pull strokes are required to fully wind the torsion spring 176; however, only 8 to 16 strokes can provide enough energy to close and open the load break switch 10 once. When the manually operated spring charging mechanism 388 is used to recharge the torsion spring 176 to its maximum preset torque, the geared motor assembly 350 will be rotated about its output shaft 184 in the same way as it is rotated when the torsion spring 176 is recharged by the motor 358. When this occurs, the pin 418 affixed to the geared housing 360, will engage with the pawl 404 and rotate the pawl 404 in a counter-clockwise direction about its pivot pin 406, thus disengaging the pawl 404 from the ratchet wheel 414 when the torsion spring 176 is fully charged.

An auxiliary switch assembly 420, shown in FIG. 6, is mounted to the support plate 126. This switch assembly 420 includes an "a" contact, which is open when the load break switch 10 is opened and is closed when the load break switch 10 is closed, and a "b" contact, which is closed when the load break 10 is open, and is open when the load break switch 10 is closed. The operating arm 422 of the auxiliary switch assembly 420 is actuated by the connecting link 424, which is pivotally attached at one end to the operating arm 422 by a pin 426, and is pivotally attached at an opposite end to the pivot pin 138, by the crank arm 134.

A contact position indicator (not shown), which is directly attached to the pawl mechanism 88 to indicate the true position of the load break switch 10, is disposed adjacent an opening in the switch housing lower portion 18 so that it is visible to an observer standing on the ground beneath the pawl mounted load break switch 10.

Secondary leads from the current transformers 78, leads from the "a" and "b" auxiliary contacts of the auxiliary contact assembly 420, and remote trip and closed control leads for the solenoid 262 can be connected to a plug in type recepticle (now shown) in the switch housing bottom portion 18, and a matching plug for this recepticle can be connected to the control cable from a remote dispatch center.

During a closing operation of the load break switch 10, the contact pressure springs 100 exert a retarding force on the pole mechanism 88 to reduce its speed during the last portion of its travel, which, in turn, reduces the impact force on the pole mechanism 88 when the lever 286 is suddenly stopped by the latch roller 270. During an opening operation of the load break switch 10, another spring 430, seen in FIG. 3, similarly exerts a retarding force on the pole mechanism 88 during the last portion of its travel to reduce the impact force on the mechanism 88 when it is suddenly stopped by the latch roller 270. The operating rod 90 extends through an opening 432 in a plate 434 affixed to one of the brackets 96. Adjacent the plate 434, a pin 436 affixed to the operating rod 90 extends through a slot 438 of a collar 440 disposed in sliding contact about the operating rod 90. A second collar 442, spaced form the first collar 440, is affixed to the operating shaft 90. The spring 430 disposed between the two collars 440 and 442, exerts a force therebetween to hold the movable collar 440 at its furtherest position from the collar 442 when the load break switch 10 is in its open position. When the operating rod 90 is moved longitudinally during an opening operation of the load break switch 10, the collar 440 is moved with the operating rod 90 until it strikes the plate 434. Then, during the last portion of the travel of the operating rod 90 and the collar 442 affixed to it, the spring 430 is further compressed to exert a retarding force on the operating rod 90.

Since various modifications of the specific embodiment of the invention described herein can be made without departing from the teachings of the present invention, it is intended that the spirit and scope of this invention be limited only by the terms of the appended claims.

What is claimed is:

1. A high voltage load break switch assembly which comprises:

a switch housing;

at least one vacuum interrupter and bushing assembly which includes first and second high voltage insulating bushings, each having opposite end surfaces which define a bushing axis and also define a passage of circular cross-section extending concentrically therethrough along the insulating bushing axis, each insulating bushing being affixed at one end to the switch housing so that the axis of the first insulating bushing is orthogonal to, and coplanar with, the axis of the second insulating bushing, each insulating bushing carrying an electrically conductive end terminal at an opposite end closing one end of the passage through the insulating bushing, a current exchange assembly which includes an annular shaped electrically conductive housing concentrically disposed about the axis of the first insulating bushing, carrying spring loaded contact members therein for making sliding contact with an electrically conductive rod extending through the annular housing along the axis of the first bushing, the current exchange assembly also includes an electrically conductive bushing rod, concentrically disposed within the passage of the second insulating bushing along the axis of the second bushing, having one end connected to the end terminal of the second insulating bushing and an opposite end affixed to the outer periphery of the current exchange conductive housing, a current exchange insulating housing, having three portions integrally joined and formed about the outer periphery of the current exchange current exchange conductive housing, the first portion of the insulating housing being concentrically formed about the bushing rod and extending from the current exchange conductive housing into the passage of the second insulating bushing, the second portion of the current exchange insulating housing being shaped generally as a hollow cylindrical portion open at both ends and extending from the current exchange conductive housing concentrically about the axis of the first insulating bushing into the passage of the first insulating bushing, and the third portion of the current exchange insulating housing being shaped generally as hollow cylindrical portion open at both ends and extending from the current exchange conductive housing concentrically about the axis of the first bushing in an opposite direction from that of the second portion of the current exchange insulating housing, mounting means for affixing the current exchange insulating housing to the switch housing, a vacuum interrupter, having a stationary electrically conducting contact rod extending from one end of the vacuum interrupter and a movable electrically conducting contact rod extending from an opposite end of the vacuum interrupter which define an axis of the vacuum interrupter, the two contact rods having adjacent inner ends within the vacuum interrupter and outer ends, the movable contact rod being movable along the axis of the vacuum interrupter between a closed position where the inner end of the movable contact rod engages with the inner end of the stationary contact rod and an open position where the inner ends of the contact rods are disengaged and separated by a suitable distance, the stationary contact rod being affixed to the end terminal of the first insulating bushing so that the vacuum interrupter is coaxially disposed within the passage of the first insulating bushing, and the opposite end of the vacuum interrupter extends telescopically into the hollow cylindrical second portion of the current exchange insulating housing, and the movable contact rod extends through the current exchange conductive housing in sliding contact with the spring loaded contact members therein into the hollow cylindrical third portion of the current exchange insulating housing, and an insulating rod, which extends along the axis of the vacuum interrupter and the first insulating bushing, which has one end affixed to the outer end of the moving contact rod of the vacuum interrupter within the cylindrical hollow third portion of the current exchange insulating housing; and switch operating means, mounted within the switch housing and connected to the opposite end of the insulating rod, for moving the insulating rod along its axis between a closed position and an opened position, to thus open and close the vacuum interrupter.

2. A high voltage load break switch assembly, as described in claim 1, wherein said current exchange insulating housing comprises an electrically insulating epoxy, which is formed by casting about portions of the current exchange assembly, to partially embed the current exchange assembly within the cast current exchange insulating housing.

3. A high voltage load break switch assembly, as described in claim 1, wherein the first portion of the current exchange insulating housing includes a cylindrical hub section adjacent the current exchange conductive housing which defines an annular slot about its periphery, and the mounting means for affixing the current exchange insulating housing to the switch housing comprise split metal mounting plates which are affixed to the switch housing and which extend into the annular slot of the cylindrical hub section.

4. A high voltage load break switch assembly, as described in claim 3, which further comprises at least one current transformer, mounted about the cylindrical hub section of the current exchange insulating housing for measuring current flow through the bushing rod of the current exchange assembly.

5. A high voltage load break switch assembly, as described in claim 3, which further comprises a conductive coating which is applied about the outer periphery of the hub sections and the outer surfaces of the cylindrical second and third portions of the current exchange insulating housing, to reduce the voltage gradient at the adjoining edges of the three portions of the current exchange insulating housing and within the annular slot of the hub section.

* * * * *